Jan. 3, 1967 E. O. P. TATTER ETAL 3,295,783

TAPE GRIPPING REEL

Filed Nov. 13, 1964 2 Sheets-Sheet 1

Inventors:
Ernest O. P. Tatter
Philip Vazzano
By Hofgren, Wegner,
Allen, Stellman & McCord Att'ys Jan. 3, 1967 E. O. P. TATTER ETAL 3,295,783

TAPE GRIPPING REEL

Filed Nov. 13, 1964 2 Sheets-Sheet 2

3,295,783
Patented Jan. 3, 1967

3,295,783

TAPE GRIPPING REEL

Ernest O. P. Tatter, Addison, and Philip Vazzano, Des Plaines, Ill., assignors to Warwick Electronics Inc., a corporation of Delaware Filed Nov. 13, 1964, Ser. No. 410,897
11 Claims. (Cl. 242—74)

This invention relates in general to tape recorder apparatus, and more particularly to a reel for winding magnetic tape and having novel means for gripping a leading end of the tape.

In the tape recording industry there has been a long felt need for a simplified apparatus which would satisfactorily perform all of the function of prior art devices while being easy to operate so as to appeal to a wide consumer market. One of the most troublesome problems which has been encountered in the use of known devices has been the necessity of manually threading the leading end of the tape from the supply reel past the magnetic head assembly to the take-up reel where the end of the tape is affixed to the take-up reel. The present invention contributes to the solving of this problem by providing a take-up reel construction with gripping means which will automatically grip the leading end of the tape as it is fed into the reel, so that it is not necessary to manually affix the end of the tape to the take-up reel. Known reel constructions for cellulose film, such as that shown in the Morgan Patent No. 2,392,492, are not saisfactory for magnetic tape, in that the rather large angular inclination of the reel sides excessively deforms the flexible magnetic tape and tends to break down the same. Reel constructions, such as that shown in the above mentioned Morgan patent, do not present a problem when used with cellulose film because the inherent elastic memory of cellulose causes the cellulose film to retain its original shape after it is removed from the reel. However, the distortions, introduced in playback of magnetic tape by the excessive and repeated transverse flexure of the tape during winding and rewinding, and during storage, render reels, such as that shown in the Morgan patent completely unsatisfactory for use with magnetic tape. The reel construction of the present invention has particular utility with automatic threading tape recorders, such as shown and described in Tatter et al. application Ser. No. 406,239 entitled Self Threading Tape Recorder and assigned to the assignee of the present invention.

An object of the invention is to provide a tape gripping reel for magnetic tape which will firmly grip the tape without deforming the same.

Another object of the invention is to provide a tape gripping reel as defined in the preceding paragraph with a wide area in which the edge of the tape can be gripped.

A further object of the invention is to provide the facing surfaces on the sides of a tape reel with inclined portions, the inclination of which is effective to grip the sides of magnetic tape without deforming the same, and which guides the tape toward the hub at the center of the reel.

Still another object of the present invention is to provide a self-gripping reel for magnetic tape as defined in the preceding paragraph with sides having parallel portions adjacent the hub of the reel for firmly gripping the edges of the tape.

A still further object of the invention is to provide an adaptor for a reel having parallel sides, so that the reel can be converted into a self-gripping reel.

These and other objects of the invention will hereinafter become more fully apparent from the following description taken in connection with the annexed drawings, wherein.

Figure 1:
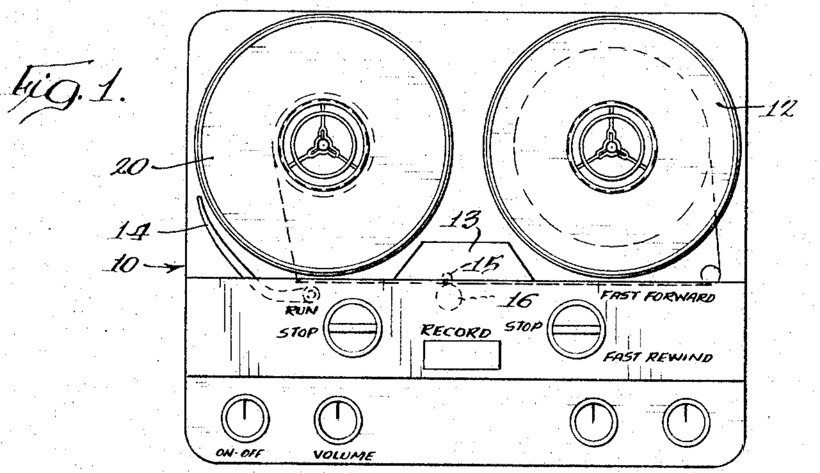
FIG. 1 is a plan view of a tape recorder employing the self-threading reel of the present invention.

While this invention is susceptible of embodiment in many different forms, there is shown in the drawings and will herein be described in detail a preferred embodiment of the invention and a modification thereof, with the understanding that the present disclosure is to be considered as an exemplification of the principles of the invention and is not intended to limit the invention to the embodiments illustrated. The scope of the invention will be pointed out in the appended claims.

Referring now to the drawings, wherein like reference characters designate like or corresponding parts, a tape recorder 10 is shown in FIG. 1 having a supply reel 12 and a take-up reel 20. As is well known in the art, the tape being fed from supply reel 12 passes along a tape path past a magnetic head assembly 13 where a capstan 15 and pressure roller 16 cooperate to feed the tape to the take-up reel 20. As is described in the above mentioned application by the same inventors directed to a self-threading tape recorder, a guide finger 14 may be provided on the tape recorder 10 for guiding the leading end of the tape into the take-up reel 20.

Figure 2:
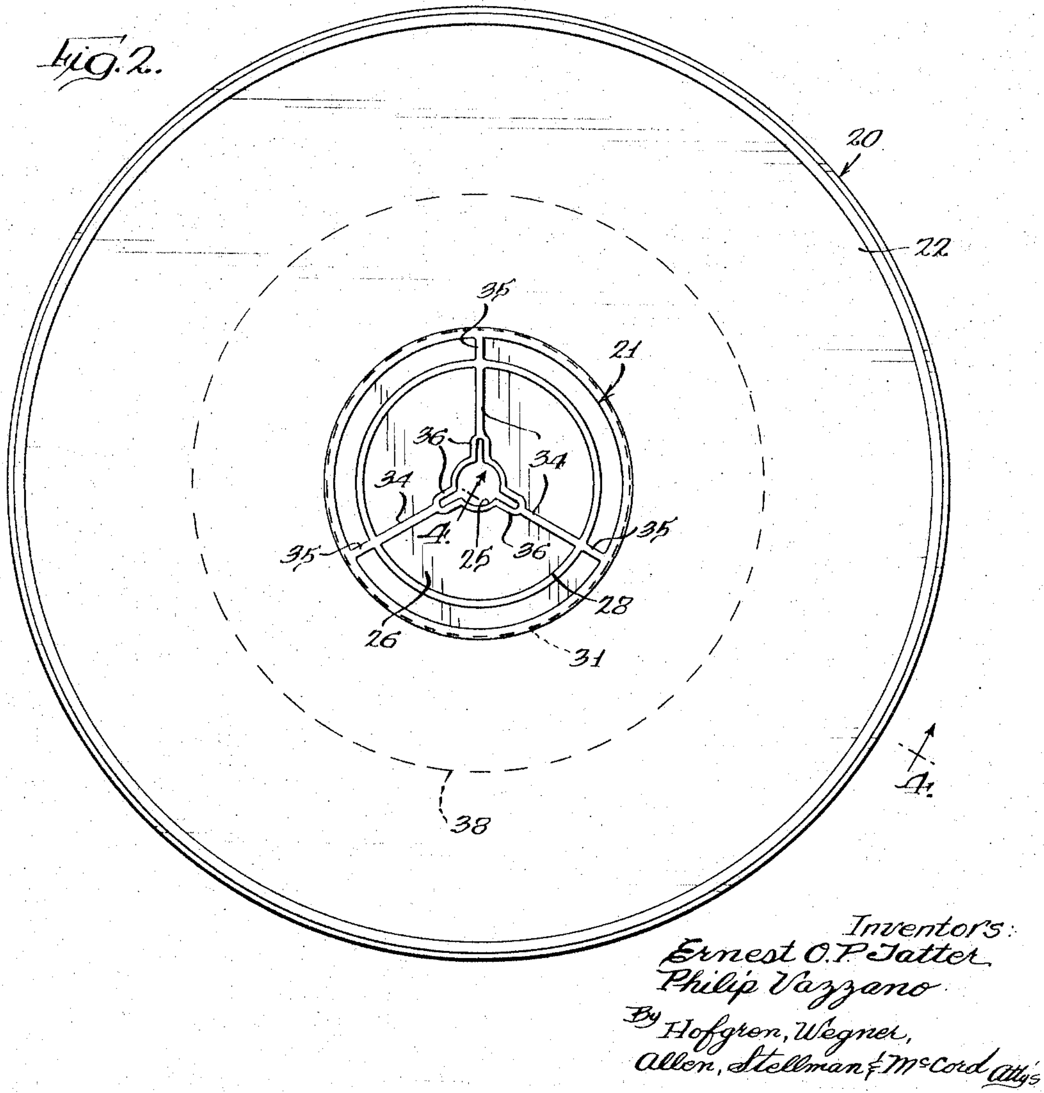
FIG. 2 is a plan view of a preferred embodiment of the tape gripping reel.
Figure 3:
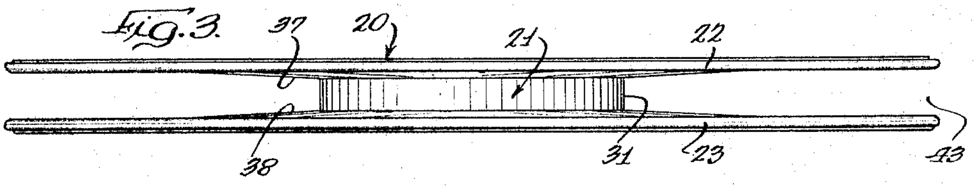
FIG. 3 is a side elevational view of the reel shown in FIG. 2.

The tape gripping reel 20 includes a generally cylindrical hub 21 about which tape is to be wound, and identical spaced sides 22 and 23 which are generally circular in shape. Hub 21 includes an annular wall 24 at the center thereof which defines a bore 25 for reception of the drive spindle for the reel 20. A web 26 is positioned generally midway between the ends of wall 24, and extends radially outwardly therefrom. Annular walls 27 and 28 are concentric with wall 24, and are disposed radially outwardly therefrom. Further annular walls 29 and 30 are provided radially outwardly of walls 27 and 28, respectively, and are also concentric with wall 24. As can best be seen in FIG. 4, sides 22 and 23 extend radially outwardly from the outer ends of walls 29 and 30, respectively. Thus, a generally cylindrical hub portion 31 is provided between sides 22 and 23. Ribs 32 and 33 connect walls 24 and 27, and 27 and 29, respectively; while ribs 34 and 35 connect walls 24 and 28, and 28 and 30, respectively. As can be best seen in FIG. 2, the ribs extending outwardly from the wall 24 are provided with enlarged portions 36 for receiving the reel driving means on the reel spindle, as is well known in the art.

Figure 4:
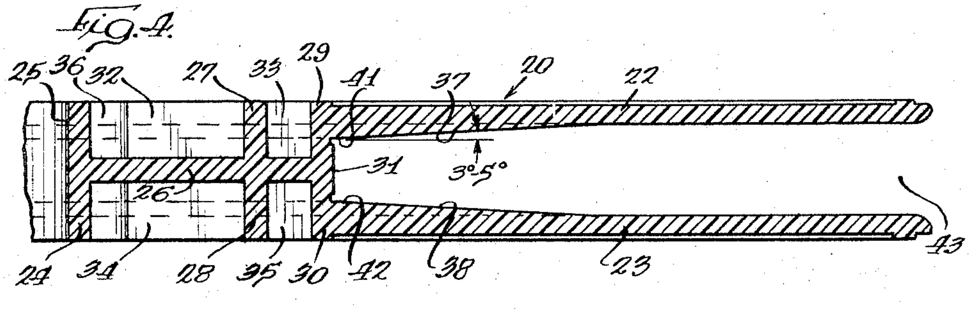
FIG. 4 is a sectional view taken geenrally along line 4—4 of FIG. 2.

As can be best seen in FIG. 4, the spaced facing surfaces of reel sides 22 and 23 are provided with inclined portions 37 and 38, respectively, adjacent reel hub 21. Side portions 37 and 38 define a gradually narrowing tape gripping channel, which is adapted to pinch the opposite edges of magnetic tape and firmly retain the same upon the reel 20. Generally parallel wall portions 41 and 42 are provided at the end of inclined portions 37 and 38, respectively, adjacent hub 21 for tightly holding the magnetic tape on the reel 20, as will hereinafter become more fully apparent.

The average width of commercially available magnetic tape is .248 inch. The distance between parallel wall portions 41 and 42 is preferably slightly less than the average magnetic tape width, so that the magnetic tape will be firmly gripped upon the reel 20. However, the difference between the spacing of wall portions 41 and 42, and the average magnetic tape width, is so slight that the tape is not bowed or deformed when it is held on the reel 20. In an exemplary embodiment of the present invention, it has been found that when walls 41 and 42 are spaced apart .242 inch, magnetic tape is firmly gripped upon the reel 20 without deformation of the same, regardless of whether the tape is slightly oversize or slightly undersize. In the exemplary embodiment, the facing surfaces of sides 22 and 23 were spaced apart .355 inch to provide a relatively wide mouth 43 for receiving the leading end of the magnetic tape.

As can be best seen in FIG. 4, the inclined sides 37 and 38 extend approximately from the mid-portion of the sides 22 and 23, and taper uniformly to the parallel wall portions 41 and 42. The outer ends of the inclined portions 37 and 38 serve as a guide means for guiding the end of the magnetic tape toward the parallel side portions 41 and 42, and inclined portions 37 and 38 are inclined at a very slight angle with respect to the axis of hub 21 to provide a wedging angle for pinching and gripping the opposite edges of the magnetic tape. It has been found that when the inclined portions of the reel sides are inclined at an angle of 5° or less with respect to the axis of the hub 21, the magnetic tape is gently pinched between the inclined side portions, without imparting any deformation to the magnetic tape, and the magnetic tape is guided without difficulty into the tape channel portion formed between the parallel wall portions 41 and 42. More specifically, it has been found that when the inclination of the side portions 37 and 38 is in the range of 3° to 5°, an effective wedge angle is provided which pinches the opposite edges of the magnetic tape to grip the same with sufficient tenacity to hold the tape on the reel 20. The surprising results obtained by the use of side portions which are inclined from 3° to 5° can be attributed to the fact that magnetic tape is relatively strong in a transverse direction, and will resist a force which is applied at its opposite edges and generally parallel to its width. Magnetic tape is also very flexible, and would tend to bow or deform whenever a force is applied which is not parallel to the width of the tape, but by providing gradually sloped sides on opposite facing surfaces of a tape receiving channel, the edges of the tape are gently pinched, and the tape aligns itself generally parallel to the axis of the reel hub as it is fed into the reel so that the tape gripping forces applied by the sides 37 and 38 will be generally parallel to the width of the tape. Since the distance between the ends of the inclined portions 37 and 38 adjacent the hub 21 are just slightly less than the average width of the magnetic tape, the tape will not bow or deform appreciably as it is wound about the reel 20. The cylindrical wall 31 provided between the reel sides 22 and 23 is important in that it allows the tape to be stored upon the reel for a long period of time without deformation.

Figure 6:
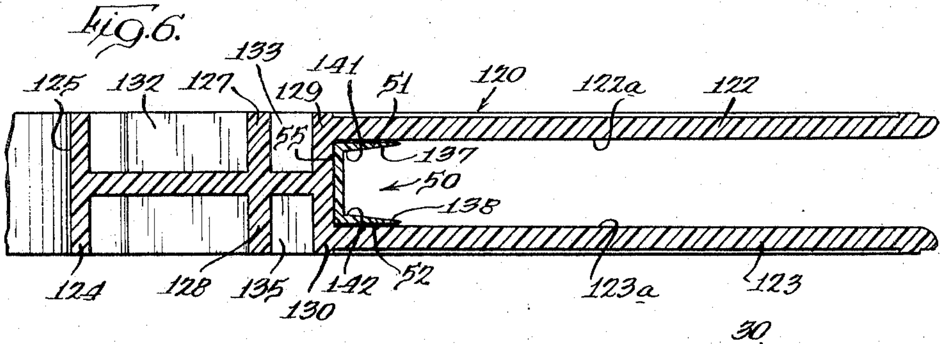
FIG. 6 is a sectional view similar to FIG. 4 showing a modified form of self-gripping reel.
Figures 5, 7:
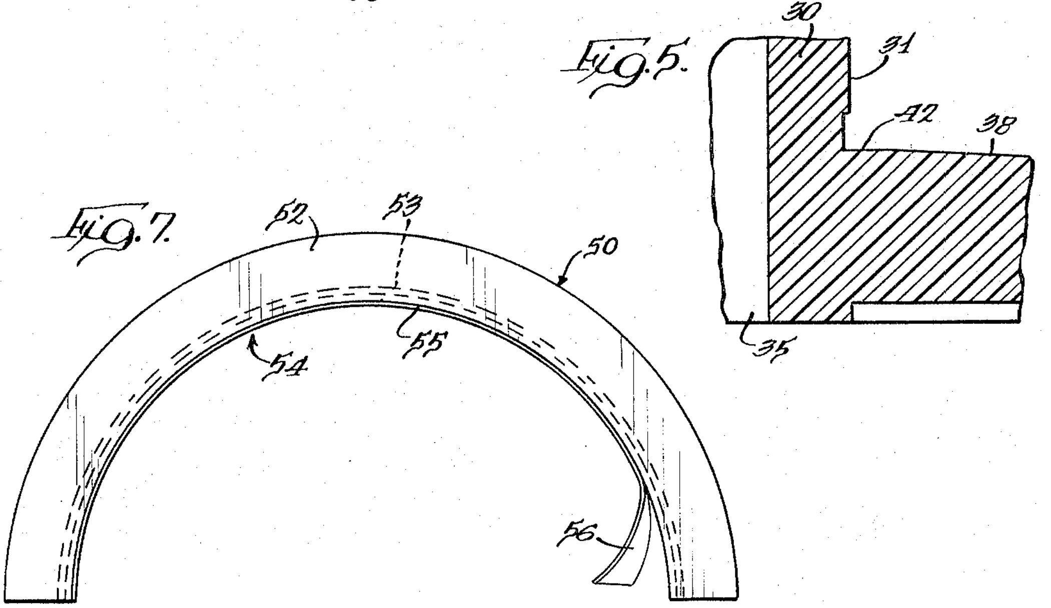
FIG. 5 is an enlarged sectional view of the junction of the reel hub and flange.
FIG. 7 is a plan view of an adaptor useable in the tape gripping reel illustrated in FIG. 6.

Referring now to the embodiment illustrated in FIGS. 6 and 7, an adaptor 50 is provided for a reel 120 having spaced sides 122 and 123 that are provided with respective parallel facing surfaces 122*a* and 123*a*. When the adaptor 50 is fixed on the reel 120 by means to be hereafter described, a structure is produced which is generally the same as that shown in FIGS. 2–5, so that similar reference numerals have been used to indicate corresponding elements, having been increased by the sum 100. Because of the similarity in the size and shape of the elements of the embodiment of FIGS. 6 and 7, it is not deemed necessary to repeat the detailed description given in connection with the embodiment of FIGS. 2–5. However, it should be noted that the adaptor 50 is formed of two generally semi-annular members 54 (FIG. 7) that are U-shaped in cross section, and which include a central portion 53, and outwardly extending sides 51 and 52. The generally semi-cylindrical undersurface 55 of each adaptor section 54 is provided with a suitable adhesive, and a protective strip 56 is provided over the adhesive, to shield the same prior to the annexation of the adaptor sections to the reel. When it is desired to affix the adaptor 50 to the reel 120, it is necessary merely to peel off the protective strip 56 and place the generally semi-cylindrical undersurface 55 of the adaptor sections in engagement with the reel hub. In this manner, an ordinary hub having spaced parallel surfaces 122*a* and 123*a* can be converted into a tape gripping reel. It should be understood, of course, that the inclined sides 137 and 138 of the adaptor cooperate in the manner described above in connection with the embodiment of FIGS. 2–5 to grip the edges of magnetic tape and retain the same on the reel 120. It should also be understood that while two generally semi-annular adaptor sections 54 have been described in connection with the embodiment of FIGS. 6 and 7, a larger number of adaptor sections may be provided, if desired.

We claim:

1. A tape gripping reel comprising: a generally cylindrical hub; first and second spaced reel sides extending outwardly from said hub, said reel sides having spaced surfaces facing one another; and each of said facing surfaces having an inclined portion adjacent the hub to define a gradually narrowing tape gripping channel, the inclination of each of said surface portions being substantially in the range of 3°–5° with respect to a plane perpendicular to the axis of said hub.

2. A reel for gripping magnetic tape comprising: a generally cylindrical hub; first and second spaced reel sides extending outwardly from said hub, said reel sides having spaced surfaces facing one another; each of said facing surfaces having a first portion adjacent the hub disposed at substantially right angles with respect thereto to define a channel having parallel sides, and each of said reel sides having a second portion inclined in the range of 3°–5° with respect to the axis of said hub diverging outwardly from the outer end of the first portion away from the second portion on the facing surface to define means for guiding said tape into said channel.

3. A reel as defined in claim 2 wherein the distance between the first portions of said side surfaces is less than the width of the tape.

4. A reel for magnetic tape comprising: a cylindrical hub having an outer surface disposed an equal radial amount from the axis of the hub; first and second spaced reel sides extending outwardly from said hub surface, said reel sides having spaced surfaces facing one another; and each of said facing surfaces having a portion adjacent the hub surface inclined at an angle in the range of 3°–5° with respect to the axis of said hub to define a gradually narrowing tape gripping channel, the inclination of each of said surface portions being sufficient to grip the opposite edges of the tape without appreciably deforming the tape.

5. An adaptor for use in a reel having a hub with spaced side comprising: at least one adaptor section having a central portion curved to fit around said reel hub; means on each adaptor section for securing the same to said hub; first and second spaced sides extending outwardly from each central portion, said sides having spaced surfaces facing one another; and each of said facing surfaces having an inclined portion adjacent the hub to define a gradually narrowing tape gripping channel, the inclination of each of said surface portions being sufficient to grip the opposite edges of the tape without appreciably deforming the tape.

6. An adaptor as defined in claim 5 wherein the means for securing the adaptor sections to the reel hub include an adhesive surface on each adaptor section.

7. A reel for gripping magnetic tape comprising: a generally cylindrical hub; first and second spaced reel sides extending outwardly from said hub, said reel sides having spaced parallel surfaces facing one another; an adaptor for said reel, and including at least one adaptor section having a central portion curved to fit around said reel hub; means on each adaptor section for securing the same to said hub; first and second spaced adaptor sides extending outwardly from each central portion, said adaptor sides having spaced surfaces facing one another; and each of said facing adaptor surfaces having an inclined portion adjacent the hub to define a gradually narrowing tape gripping channel, the inclination of each of said adaptor surface portions being sufficient to grip the opposite edges of the tape without appreciably deforming the tape.

8. A reel as defined in claim 7 wherein said adaptor is defined by two generally semi-annular adaptor sections.

9. A reel as defined in claim 7 wherein the inclination of each of said adaptor surface portions is in the range of 3° to 5° with respect to the axis of the hub.

10. A magnetic tape gripping device comprising: a member having a cylindrical portion; first and second spaced sides extending outwardly from said cylindrical portion, said sides having spaced surfaces facing one another; each of said facing surfaces having a first portion adjacent said cylindrical portion disposed at generally right angles with respect thereto to define a tape channel having parallel sides, and each of said sides having an inclined second portion diverging outwardly from the outer end of the first portion to define means for guiding said tape into said channel, the inclination of said second portion being in the range of 3° to 5° with respect to a plane perpendicular to the axis of said cylindrical portion, and the distance between said first portions being less than the width of said tape.

11. A magnetic tape gripping device comprising: a member having a cylindrical portion; first and second spaced, identically shaped sides extending outwardly from said cylindrical portion and formed integrally therewith, said sides being imperforate and generally circular in shape and having spaced surfaces facing one another; each of said facing surfaces having a first portion adjacent said cylindrical portion disposed at generally right angles with respect thereto to define a tape channel having parallel sides, and each of said sides having an inclined second portion diverging outwardly from the outer end of the first portion to define means for guiding said tape into said channel, the inclination of said second portion being in the range of 3° to 5° with respect to a plane perpendicular to the axis of said cylindrical portion, and the distance between said first portions being less than the width of said tape.

References Cited by the Examiner

UNITED STATES PATENTS

| | | | |
|---|---|---|---|
| 1,861,891 | 6/1932 | Wittel | 242—74 |
| 2,226,825 | 12/1940 | McCauley | 242—74 |
| 2,392,492 | 1/1946 | Morgan et al. | 242—74 |
| 2,462,261 | 2/1949 | Goldberg | 242—74 X |

FRANK J. COHEN, *Primary Examiner.*

MERVIN STEIN, *Examiner.*

N. L. MINTZ, *Assistant Examiner.*